Fig.1

United States Patent Office 3,368,131
Patented Feb. 6, 1968

3,368,131
MULTISPEED INDUCTION TYPE ELECTRIC MOTOR SELECTIVELY OPERATIVE WITH AT LEAST TWO PRIMARY MAGNETIC POLES WHICH DIFFER IN NUMBER FOR DIFFERENT RUNNING SPEEDS
Irvine E. Ross, Fort Wayne, Ind., assignor to General Electric Company, a corporation of New York
Filed Sept. 13, 1965, Ser. No. 487,000
10 Claims. (Cl. 318—224)

ABSTRACT OF THE DISCLOSURE

To furnish a multispeed induction motor with selective operation at a number of speeds, a stator has at least one preselected primary pole of primary poles $P_1$ formed by two or more coil groups. These poles produce one speed of operation for the motor, with the two coil groups being in additive magnetic polar relation. To establish primary poles $P_2$ which differ in number from $P_1$, the polarity of one of the two coil groups is reversed, the coil groups being excited along with additional coil groups to form poles $P_2$. Some of these additional coil groups may be connected either in cumulative or differential magnetic polar relation with coils in the one preselected primary pole. The stator also has auxiliary coils which are energized for all conditions of starting. With this arrangement, the attainment of a desired effective ampere-turn pattern for the primary poles and the efficient utilization of the stator slots are permitted.

Background of the invention

This invention relates to alternating current multispeed induction type electric motors and more particularly to single phase electric motors of the distributed wound type adapted to operate selectively at two or more different speeds.

In the past, there has been a practical difficulty in furnishing a versatile, yet economically attractive multispeed single phase, induction type electric motor which is potentially capable of satisfactory use in a number of applications having different torque and speed requirements without necessitating a total re-design of the motor stator core and winding arrangement. By way of example, one such multispeed motor includes a stator core accommodating at least two distributed wound main windings of the well-known concentric balanced coil type in which the windings are independently energized to produce different speeds of operation. Each main winding in this construction normally has a number of identical coil groups which provide a corresponding number of magnetic run poles, with each group being formed by a plurality of coils of different throws all having a common axis, the center of the run pole.

With specific reference to two speed motors, two main windings are usually furnished to provide selective operation at two different speeds. For instance, the common four-six magnetic running pole operates under running conditions at either nominal speeds of 1725 r.p.m. or 1140 r.p.m. producing a higher output torque at the four pole operation. This type of motor is normally used in different applications, dictating dissimilar performance capabilities, such as multispeed blowers contrasted with domestic washer applications. In one case, the output torque at each speed may be satisfactory yet in another, the performance of the motor at each speed might not meet the requirements for that application.

Summary of the invention

It is therefore a principal object of the present invention to provide an improved multispeed electric motor selectively operative at two or more speeds, and it is a further object to provide such a motor which overcomes the difficulties mentioned above.

It is a further object of the present invention to provide an improved multispeed motor winding arrangement which is inherently versatile in nature, permits economy in its utilization, produces preselected performance at each speed of operation and allows the attainment, if desired, of an excellent ampere-turn pattern for the running poles of the motor.

In carrying out the objects of the present invention in one form, I provide an improved single phase multispeed induction electric motor capable of use for a number of diverse applications. The motor has a first plurality of serially connected concentric wound primary coil groups adapted to establish a total number of primary magnetic running poles $P_1$, with adjacent poles being of opposite instantaneous polarities. Further, at least two poles $P_1$ are formed by more than one preselected coil group, preferably coincident about the same pole center in additive magnetic relation, to provide the given pole of $P_1$ with predetermined effective turns. When these coil groups are concurrently energized, they produce one selective speed of operation. A second plurality of serially connected, concentric wound primary coil group is also furnished such that when serially energized with one of the preselected coil groups of each of the two poles for the first plurality, a total number of primary magnetic running poles $P_2$ are formed in excess of the number of poles $P_1$ to furnish a lower speed of operation. The polarity is reversed for one of the preselected coil groups when energized along with the second plurality of coil groups to produce the lower operating speed.

By proper correlation of the effective turns for the preselected coil groups of the first plurality with the effective turns of coil groups in the same poles during the establishment of poles $P_2$, the performance of the motor at the selected operating speeds can be matched to the application. In addition, among other benefits, even though an unusually large savings of coil material can be realized, the provision of a desirable ampere-turn pattern for the poles of $P_1$ and $P_2$ is also possible.

Further aspects of my invention will become apparent hereinafter, and the specification concludes with claims particularly pointing out and distinctly claiming the subject matter which I regard as my invention. The invention, however, both as to organization and method of operation, together with further objects and advantages thereof, may best be understood by reference to the following description when taken in conjunction with the accompanying drawings.

*Description of the preferred embodiments*

Figure 1:
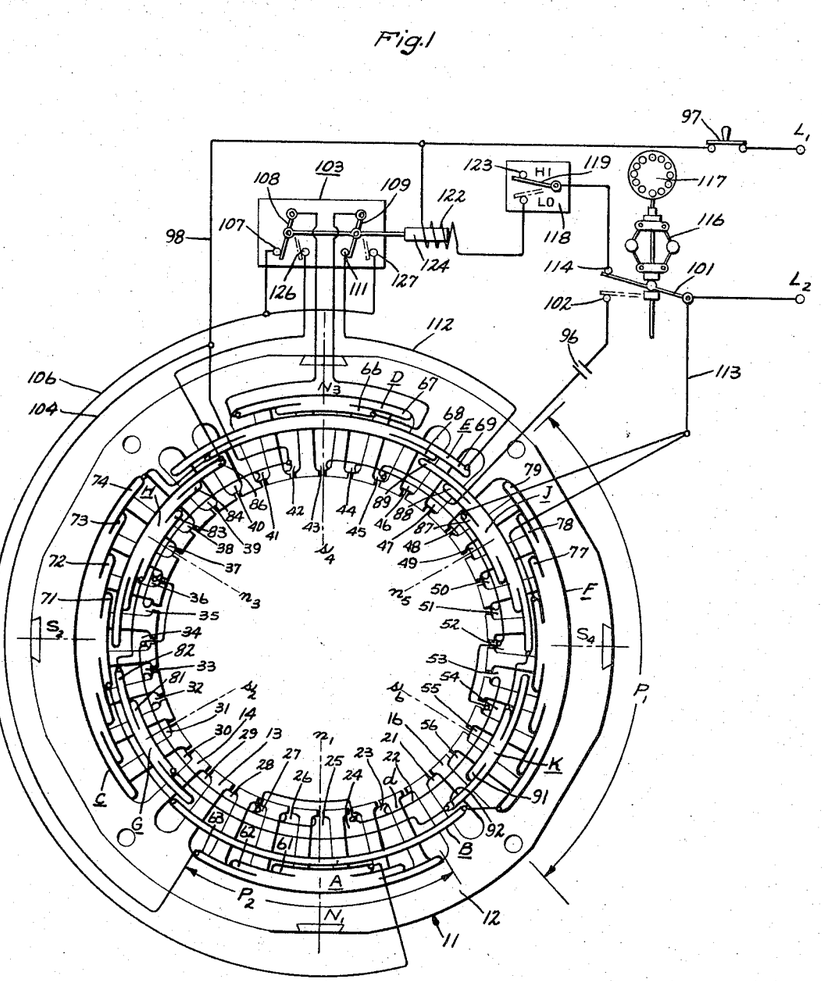
FIGURE 1 is a schematic end view of a stator member of a single phase split phase, induction type multispeed electric motor incorporating one form of the improved winding arrangement and motor circuitry of my invention, the motor being adapted for selective operation with either four or six primary magnetic running poles.
Figure 2:
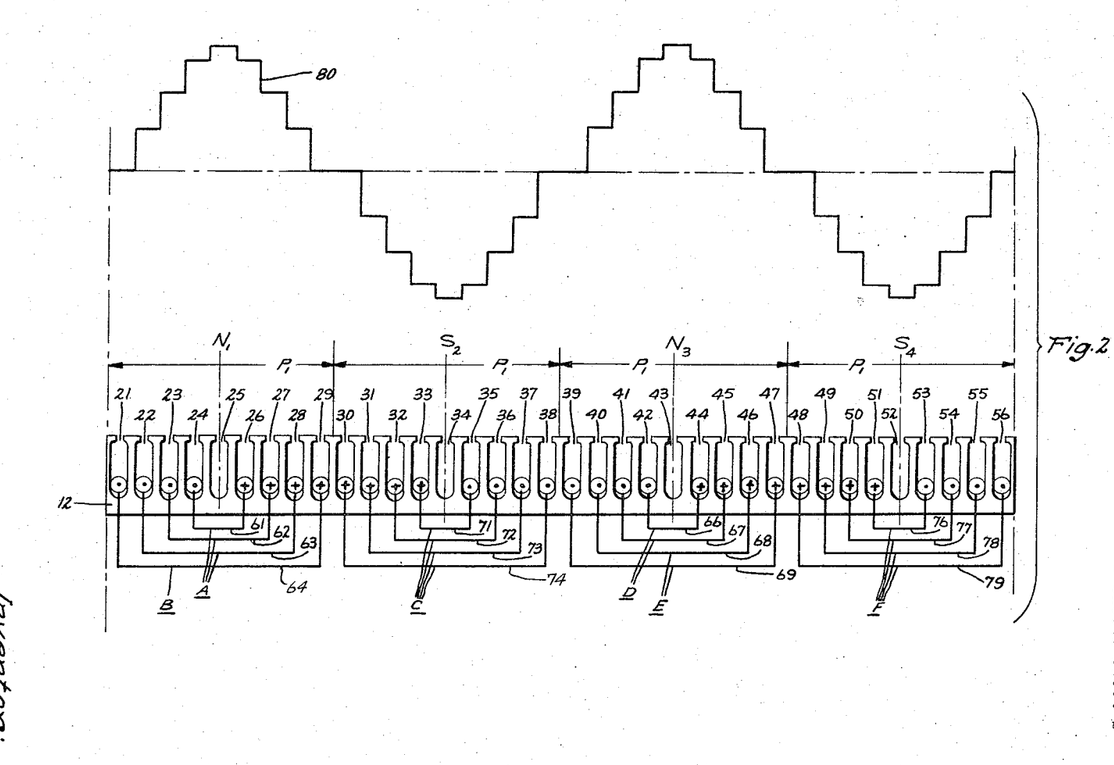
FIGURE 2 is a schematic diagram showing the stator core illustrated in FIGURE 1 and the manner in which the winding coils of the exemplification selectively energize to establish four primary running poles and provide the high speed of operation, the figure further revealing an ampere-turn pattern capable of being provided by the four poles.
Figure 3:
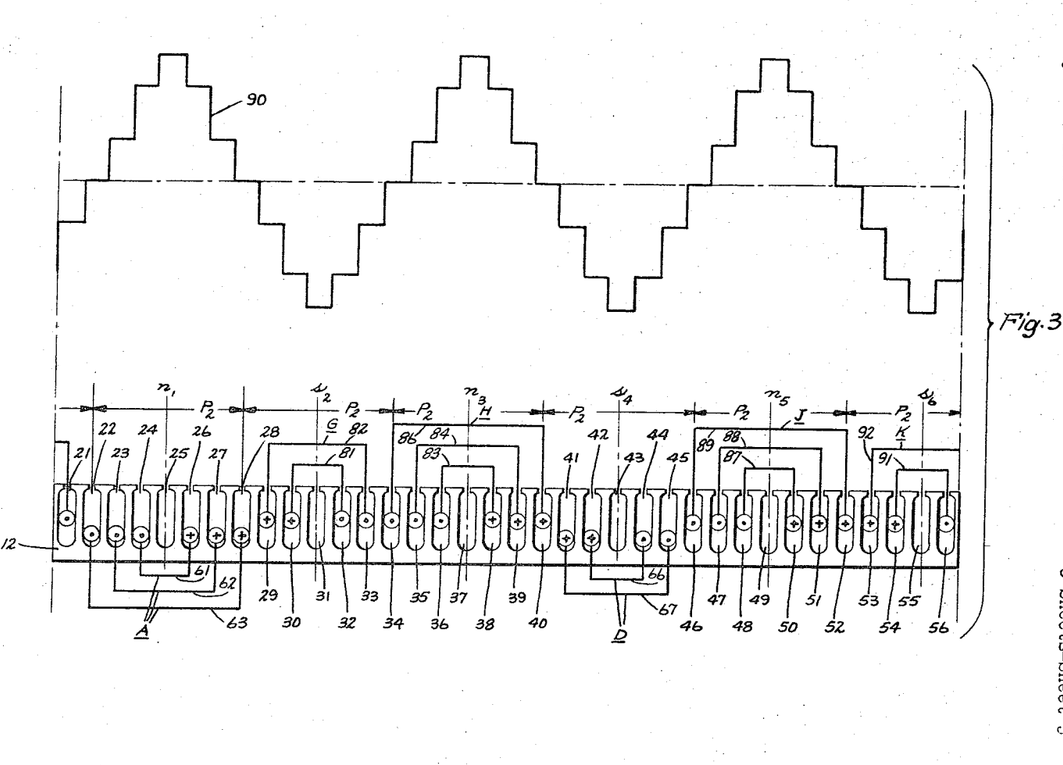
FIGURE 3 is a schematic diagram showing the stator core of FIGURE 1 and the winding coils of the exemplification selectively energized to provide six primary running poles for a lower speed of operation, with the ampere-turn pattern which may be developed for the six pole operation also being illustrated.

Turning now to the drawings in more detail and in particular to FIGURES 1–3 inclusive, for the purpose of explaining one aspect of my invention, I have shown the first embodiment incorporated in a multispeed single phase, split phase induction type electric motor selectively operable under running conditions at two different speeds respectively produced by four and six primary magnetic running poles. In the illustrated exemplification of FIGURE 1, the two speed motor includes a stator member 11 conventionally formed with a laminated magnetic core having a circular yoke section 12 and thirty-six angularly spaced apart teeth sections 13 each terminating in a lip section 14 which together define a circular rotar receiving bore 16 in the usual way. Between adjacent teeth sections are located a total of thirty-six substantially identical, angularly spaced apart, coil accommodating slots, identified by numerals 21–56 inclusive, with each slot having a slot entrance in communication with bore 16 at ten degree intervals in the customary fashion.

In the illustrated embodiment of the two-speed motor shown in the first three figures, and with specific reference to FIGURES 1 and 2, the thirty-six slotted stator core carries a plurality of distributed wound, serially connected primary coil groups A–F inclusive, which when excited, establish four primary magnetic running poles $P_1$ of approximately the same angular length to produce high speed operation for the motor. The six coil groups A–N are arranged and interconnected such that adjacent poles $P_1$ have opposite instantaneous polarities, with the radial centers of these poles being referenced in FIGURES 1 and 2 as $N_1$, $S_2$, $N_3$, and $S_4$ respectively. For simplicity of presentation, the individual poles of $P_1$ now to be described will be identified by these character references.

In particular, magnetic pole $N_1$ is formed by coil groups A and B. Coil group A is defined by three concentric coils 61, 62, and 63, the coils having different throws or spans; e.g., outermost coil 63 of the group being accommodated in slots 22, 28, while coils 61 and 62 have sides in slots 24, 26 and in slots 23, 27. In addition, the three coils have a common radial axis or center, which is the center of pole $N_1$. Coil group B, coincident with the radial center of pole $N_1$, is defined by a single coil 64 accommodated in slots 21, 29 and in effect the outermost concentric coil for the pole. For purposes of explanation, it is assumed that a current flow through the four coils of pole $N_1$ is in the direction depicted in FIGURE 2, where standard symbols ⊙ and ⊕ denote current flows respectively toward and away from the viewer to create a north pole. It will thus be appreciated from FIGURE 2 that the current flow through the individual coils of groups A and B is in the same relative direction on either side of the center line of the pole to produce the same polarity for the coil groups and the four coils are in additive magnetic relation as they cooperate to establish pole $N_1$.

Pole $N_3$, which has the same polarity as pole $N_1$ and is diametrically opposite to pole $N_1$ on the stator core, is established by two magnetically additive coil groups D and E in a manner similar to that described for pole $N_1$. However, these coil groups D and E are defined by two concentric coils each 66, 67 and 68, 69. The four coils are concentric with respect to the radial center and no coil side shares the same slot so that they include different throws or spans, with the coils of group D being the innermost coils of the pole.

The other two poles $S_2$ and $S_4$ of poles $P_1$ have south polarity and are respectively formed by single coil groups C and F, arranged in diametrically opposed relation on the core. The coils of each group have different throws and are concentric about the radial center of the associated poles as best seen in FIGURE 1. Numerals 71–74 inclusive identify the coils in group C while the coils in group F are denoted by numerals 76–79. Consequently, it will be seen from the first two figures that the six coil groups in effect provide a so-called balanced coil distribution, with the coils of the individual poles being arranged to have the relative current flows or polarities depicted in FIGURE 2 when excited for four pole operation.

By the proper selection of the total number of effective turns per pole $P_1$ and of the coil turn deployment, it is possible not only to furnish a satisfactory output torque for high speed operation, but also to provide a desirable ampere-turn pattern. For example, the following is a typical turn distribution for the coils of the illustrated exemplification:

| Coil identification: | Conductor turns per coil |
|---|---|
| 61, 66, 71, 76 | 18 |
| 62, 67, 72, 77 | 36 |
| 63, 68, 73, 78 | 45 |
| 64, 69, 74, 79 | 51 |

In the above turn distribution, each of the four poles has a total of 150 turns and 118.5 effective turns. The distribution factor of each pole, a function of the sine of the electrical angle in the pole and an indication of the effectiveness of the turn dependent relative to the polar center, is a satisfactory 0.79. The ampere-turn wave form or pattern for the example turn is schematically revealed in FIGURE 2 where the pattern is located directly over the coils of poles $P_1$ which form it and is identified by numeral 80. It will be seen from FIGURE 2 that the wave form attributable to the example is the highly desirable sinusoidal form, symmetrical with respect to the horizontal line shown therein.

Turning now to a consideration of the low speed running operation for the illustrated motor, it will be assumed that the motor application does not demand a matched low speed-torque output combination or exacting performances at each speed of operation, such as certain blower or fan applications. To produce the slow speed (FIGURES 1 and 3) six similar primary magnetic running poles $P_2$ of opposite instantaneous polarity are established, each having approximately the same angular length. By a feature of the present invention in the illustrated form, six primary coil groups G, H, J, and K, carried by the core, are serially connected with inner coil groups A and D respectively of poles $N_1$, $N_3$ of the high operating speed to establish poles $P_2$ while coil groups B, C, E, and F are inactive. The six radial centers of poles $P_2$ are denoted either by "n" or "s" character references (north or south poles) and an appropriate numerical 1–6 inclusive. These six references will also be used to identify the individual poles of $P_2$ for convenience of discussion.

From FIGURES 1 and 3, it will be seen that each of the six coil groups are concentric relative to the polar centers with the number of coils per coil group, including group A and D, being chosen such that adjacent coil groups have a dissimilar number of coils, either two or three in the exemplification. Thus, the coils in alternate coil groups are similarly deployed and each pole consists of two and one half coils. Coil groups A, G, H, D, J, and K are respectively defined by the following coils: 61, 62, 63; 81, 82; 83, 84, 86; 66, 67; 87, 88, 89; and 91, 92. Half of the turns of outermost coils 63, 86, and 89 of groups A, H, and J are therefore in effect located in adjacent poles $P_2$. By providing the relative current flows in the coils of the six coil groups as indicated by symbols ⊙ and ⊕ in FIGURE 3, six poles having the correct polarities will be generated.

In order to obtain an ampere-turn pattern for the six pole $P_2$ operation in the exemplification of FIGURES 1–3 similar to the pattern for the four poles $P_1$, the turns chosen for the coils in coil groups G, H, J, and K should be based upon the turns for coil groups A and D. The following is a turn distribution which provides the symmetrical, sinusoidal ampere-turn pattern 90 in FIGURE 3:

| Coil identity: | Conductor turns per coil |
|---|---|
| 61, 81, 83, 66, 87, 91 | 18 |
| 62, 82, 84, 67, 88, 92 | 36 |
| 63, 86, 89 | 45 |

With this distribution, each pole $P_2$ includes 76.5 turns, 62.7 effective turns, and a respectable distribution factor of 0.82.

It should be noted at this time from a comparison of FIGURES 2 and 3 that in the two speed motor of the exemplification, the coils in coil group A are energized to provide the same polarity for both speeds of operation. However, the polarity of the coils in coil group B is reversed for the high and low speeds. This reversal of polarity in one of the coil groups energized for more than one speed of operation is usually necessary when the quotient of the ratio of the running poles $P_2/P_1$ is a non-integer; e.g., 6/4=1½ in the illustrated two-speed motor.

In the present exemplification of the invention shown by FIGURE 1, stator core 11 also accommodates four serially connected auxiliary coil groups a, b, c, d, adapted for parallel connection with main coil groups A–F, to provide auxiliary magnetic poles corresponding in number to the four primary poles $P_1$ under starting conditions. The auxiliary coil groups, in a manner akin to coil groups A, D, G, H, J, and K are formed of dissimilar concentric coils at adjacent poles which in turn are displaced ninety electrical degrees from primary poles $P_1$. The desired displacement in the current phases between the coils at the primary and auxiliary poles may be obtained in any convenient way, such as capacitor 96 in series with the auxiliary coil groups for the illustrated capacitor start motor.

Any suitable circuitry may be utilized to achieve the desired selective energization of the coil groups from a source of single phase alternating power to produce the high and low operating speed conditions. One inexpensive yet satisfactory arrangement is schematically presented in FIGURE 1. As mentioned before, under starting conditions, at either selected speed of operation, auxiliary coil groups a, b, c, d are energized in parallel with primary coil groups A–F. With regard to the auxiliary coil groups, they are in series between a pair of common power input lines $L_1$, $L_2$ connectable to the power source through an OFF-ON switch 97 and conductor 98 on the one side to line $L_1$. On the other side, a closed circuit is made with line $L_2$ through engageable (broken line position) movable and stationary contact elements 101, 102 of a conventional centrifugally operated switch. A primary coil group controlling switch 103 of the double pole-double throw type is used to connect primary coil groups A and D in series with coil groups B, C, E, and F during starting and the high speed operation and to change polarity of one of the two coil groups when they are in series with primary coil groups G, H, J and K to effect the low running speed.

More specifically, for starting and high speed running conditions, a completed circuit is made between lines $L_1$, $L_2$ as follows, beginning from the closed OFF-ON switch 97 in line $L_1$ through conductors 98, 104 to one side of coil group A, then from the other side to contact post 107 of coil group controlling switch 103 by conductor 106. The circuit continues through a pair of electrically separated and concurrently movable contact elements 108, 109 by way of coil group D attached therebetween, and then from element 109 and the engaged and stationary contact post 111 through the serially connected coil groups B, C, E, and F to line $L_2$ via conductors 112, 113. Consequently, with the movable contact elements of switch 103 in the illustrated full line position of FIGURE 1, the six coil groups are energizable in series to establish the relative current flows and magnetic poles best seen in FIGURE 2.

After the motor has reached a predetermined speed, such as 75% of the high running speed produced by poles $P_1$ or in the neighborhood of 1325 r.p.m. for the example motor, the movable contact arm 101 of the centrifugally operated switch is moved out of engagement with contact post 102 thereby opening the auxiliary coil group circuit and into alternate engagement with contact post 114. Any standard centrifugal mechanism 116, responsive to the rotational speed of the motor rotor 117, may be employed to actuate arm 101. The mechanism disclosed in the A. F. Welch Patent No. 2,149,108 is typical of such mechanisms.

Still referring to FIGURE 1, once the predetermined speed has been attained and arm 101 of the centrifugally operated switch engages its associated post 114, then a single pole, double throw speed selector switch 118 becomes effective to regulate the operation of coil group controlling switch 103 which in turn controls the selective energization of the primary coil groups. This regulation and control is readily accomplished by connecting movable contact arm 119 of switch 118 to post 114 of the centrifugally operated switch and the low ($L_0$) speed post 121 to a solenoid coil 122 and conductor 98. The solenoid core 124 is arranged to actuate the movable elements 108, 109 between the solid and the broken line positions in response to the excitation of coil 122. The high (Hi) speed post 123 of switch 118 is always in open circuit. Thus, with arm 119 of the speed selector switch in the "Hi" speed position, the pair of movable elements 108, 109 of switch 103 will be in the full line position and primary coil groups A–F inclusive will be serially excited between lines $L_1$, $L_2$ as already explained to establish poles $P_1$ for starting and high speed operations.

When arm 119 of speed selector switch 118 is placed in the "$L_0$" speed position, the solenoid coil becomes energized, actuating the solenoid core 124 thereby moving contact elements 108, 109 into alternate engagement with stationary posts 126, 127 (broken line positions). Coil groups A and D will be connected in series with coil groups G, H, J, and K, reversing flow through switch elements 108, 109 and polarity coil group D, to establish the six primary poles $P_2$ for low speed performance. Post 127 is in circuit with conductor 106 and one side of coil group A while a closed circuit is made between post 126 and conductor 113 through the four coil groups G, H, J, and K.

Consequently, it will be recognized from the foregoing that among other advantageous features, my invention provides economy in coil material utilization while permitting the attainment of a desired ampere-turn pattern and performance characteristics for the motor. Further, as will now be appreciated from a consideration of FIGURES 4–6 inclusive, my invention is inherently versatile in nature and also allows the same basic motor construction to be advantageously used for a number of applications requiring different and exacting performances for all speeds of operation. A motor for driving a washing machine agitator is an example of this situation.

Figure 4:
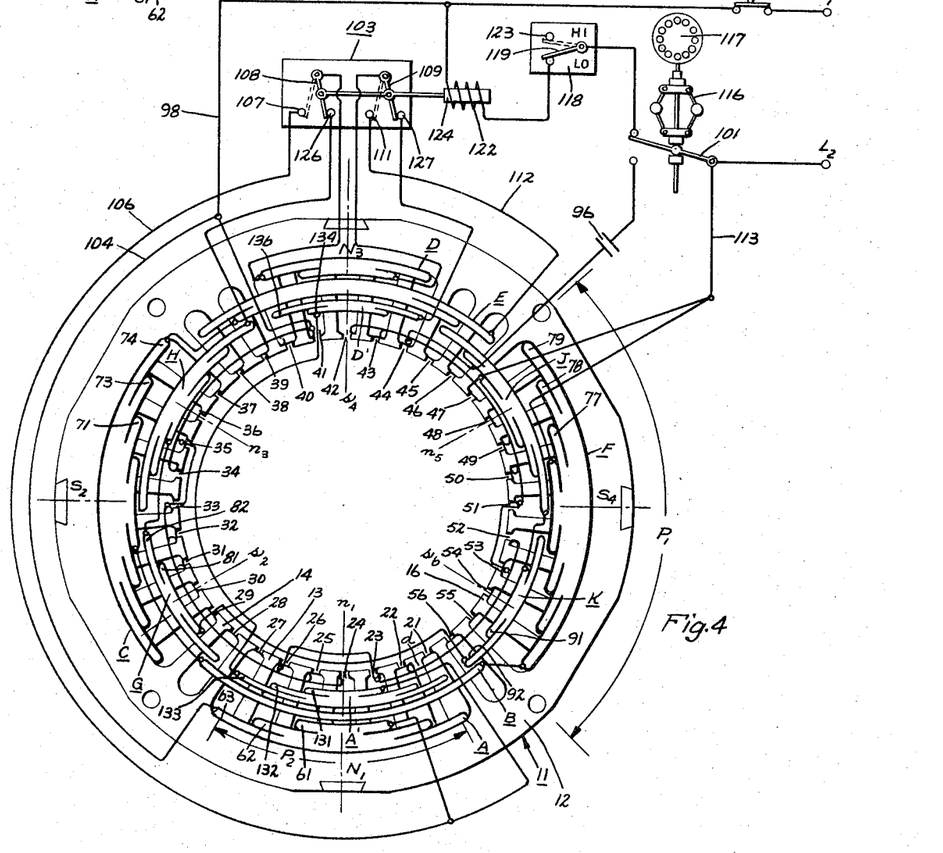
FIGURE 4 is a schematic view of the single phase, split phase induction type multispeed electric motor shown in FIGURE 1, with the motor having a modified winding arrangement and circuitry to effect selective operation with either four or six primary running poles.
Figure 5:
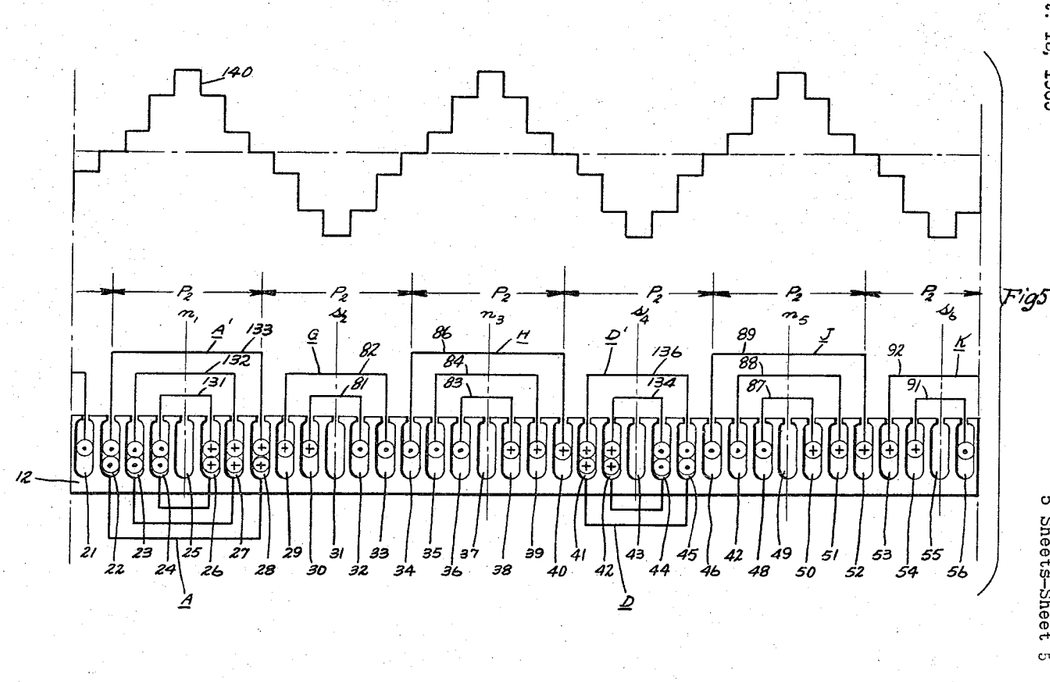
FIGURE 5 is a schematic diagram of the type seen in FIGURE 3 for the motor of FIGURE 4, setting out the manner in which the six primary running poles are established in the exemplification, as well as the type of ampere-turn pattern which may be derived therefrom.
Figure 6:
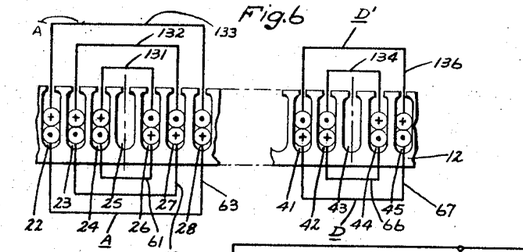
FIGURE 6 is a schematic diagram of part of the stator core and winding coils shown in FIGURE 5, revealing the way in which preselected coils are interrelated to change certain performance characteristics of the six primary poles shown in the previous figures.

Turning to FIGURES 4, 5, and 6, where like components are identified by the same numerals used in the first three FIGURES, the multispeed motor is essentially the same as that already described, differentiating therefrom principally by the addition of primary coil groups $A^1$ and $D^1$ for the establishment of low speed poles $P_2$. By arranging coil groups $A^1$ and $D^1$ on the core 11 in the polar locations of $n_1$ and $s_4$, and connecting them such that their polarities have a preselected relation to the associated coil groups A, and D, it is possible to make the number of turns per coil group for the low speed operation independent of the turns for the high speed coil groups. Thus, the comparative strengths of the poles $P_1$ and $P_2$ may easily be varied to change the relative output characteristics of the two speeds and, if desired, still retain the beneficial basically sinusoidal ampere-turn polar pattern for each speed of operation. For convenience in placement of the coils in the slots, excellent slot utilization, and to obtain maximum benefit of my invention, coil group $A^1$ in the exemplification has concentric coils 131, 132 and 133 accommodated in the same slots as the coils 61, 62 and 63 of coil group A, with the radial centers of the two groups being coincident. In a like fashion, coil group $D^1$ simulates coil group D in appearance, that is, concentric coils 134, 136 of coil group $D^1$ reside in the same slots as coils 66, 67 of coil group D with the radial center $s_4$ serving as the axis for both coil groups.

If the motor application dictates that the relative polar strengths between poles $P_1$ and $P_2$ should be weaker than that provided in the first embodiment of generate a desired output at each speed, then coils groups $A^1$ and $D^1$ should be arranged such that their polarities have a commulative effect with respect to associated coil groups A and D. As shown in FIGURE 5, the current flow through the coils generates a magnetic additive relation between associated coil groups in poles $n_1$ and $s_4$. By basing the turns for the other four poles of the net effect produced in poles $n_1$ and $s_4$, the desired reduction in polar strength for the poles $P_2$ as contrasted to poles $P_1$ can be accomplished. For instance, assuming the example turn distribution already given for coil groups A and B, the cumulative effect may be understood from the following distribution chart:

| Coil Identity | 61, 66 | 131, 134 | 62, 67 | 132, 136 | 63 | 133 | 81, 83, 87, 91 | 82, 84, 88, 92 | 86, 89 |
|---|---|---|---|---|---|---|---|---|---|
| Conductor turns/coil | 18 | 5 | 36 | 10 | 45 | 15 | 23 | 46 | 60 |
| Net effect (turns) | | 23 | | 46 | 60 | | 23 | 46 | 60 |

Each pole $P_2$ therefore has a total of 99 turns, 81.5 effective turns and a distribution factor of 0.82. The ampere-turn pattern produced by the example turn distribution is indicated by numeral 140 in FIGURE 5. In spite of the addition of coil groups $A^1$ and $D^1$, there is still sufficient space in each slot to accommodate all coils, both primary and auxiliary coil groups.

If, on the other hand, it is desired to straighten poles $P_2$ relative to poles $P_1$ to secure a given performance at each operating speed, then coil groups $A^1$, $D^1$ may be arranged relative to groups A, D to produce a differential effect. In other words, as shown in FIGURE 6, the coils in these pairs of associated coil groups have opposing polarities and subtracting magnetic relationships. Reverse winding of the coils in groups $A^1$, $D^1$ into their accommodating slots results in the change of polarity shown in FIGURES 5 and 6.

Illustrative of the differential effect to strengthen the six poles $P_2$ is the following turn distribution which provides 54 total turns/pole, 44 effective turns/pole, and a distribution factor per pole of 0.82:

| Coil Identity | 61, 66 | 131, 134 | 62, 67 | 132, 136 | 63 | 133 | 81, 83, 87, 91 | 82, 84, 88, 92 | 86, 89 |
|---|---|---|---|---|---|---|---|---|---|
| Turns/coil | 18 | 5 | 36 | 10 | 45 | 15 | 13 | 26 | 30 |
| Net effect | | 13 | | 26 | 30 | | 13 | 26 | 30 |

Once again, a basically sinusoidal ampere-turn pattern (not shown) is furnished which resembles wave form 140 in FIGURE 5.

In order to provide either the cumulative or differential effects shown by FIGURES 5 and 6 for low speed operation, the coil groups A, $A^1$, D, $D^1$, G, H, J, and K may be serially energized in any suitable fashion, such as a slight modification (FIGURE 4) of the circuitry already explained in connection with FIGURE 1. The circuitry of FIGURE 4 differs from that of FIGURE 1 in that coil group $D^1$ has one side attached to post 127 of switch 103 and the other side connected to one side of coil group $A^1$. The other side of $A^1$ is connected to conductor 106 for attachment to post 107 and by conductor 115 to coil group A. Therefore, for low speed operation, a completed circuit is made between lines $L_1$, $L_2$ by way of conductor 113, coil groups J, K, G, and H to post 126 of switch 103. Coil group D is in closed circuit between post 126 and 127 which in turn is in series with coil groups $A^1$, A, conductors 104, 98 and then to line $L_1$.

The advantages and benefits of the present invention are readily manifest from the above description. It is not only practical to furnish the desired performance for a multispeed motor at each operational speed, but in addition, it is possible to achieve considerable economy in coil material and in coil formation. Moreover, the construction is versatile in nature and yet allows the attainment of the desired ampere-turn pattern for each speed. Unusually excellent slot utilization is also afforded in spite of the use of primary and auxiliary coil groups.

It should be apparent to those skilled in the art that while I have described certain aspects of the present invention in connection with a two speed motor selectively operative at four and six poles, the principles enunciated above are equally applicable to other two or more speed multipolar arrangements employing a minimum of at least two poles $P_1$ for high speed operation. It will be further understood that although the coil groups, coil deployment, and effective turns per pole, among other things, presented herein derive optimum results of my invention, such as the excellent sinusoidal ampere-turn pattern and are illustrative examples thereof, the invention is not limited thereto. Therefore, it will be obvious to those skilled in the art that changes and modifications may be made in the disclosed multispeed motors without departing from my invention, and it is consequently aimed in the appended claims to cover all such changes and modifications as fall within the true spirit and scope of the invention.

What I claim as new and desire to secure by Letters Patent of the United States is:

1. In a distributed wound multispeed induction motor selectively operative at a plurality of running speeds, a stator core having a number of slots; a first plurality of concentric wound coil groups formed by conductor turns accommodated in some of the stator slots to provide a total number of magnetic running poles $P_1$, with adjacent poles being of opposite instantaneous polarity, with at least first and second magnetic running poles each having two preselected coil groups coincident about the same pole center in additive magnetic polar relation, and with said preselected coil groups all having the same polarities; said running poles $P_1$ producing one speed of operation when the first plurality of coil groups are selectively energized; a second plurality of concentric wound coil groups formed of conductor turns accommodated in some of the stator slots; means for energizing one of the preselected coil groups in said first magnetic running pole to provide the same polarity as for one speed of operation, for reversing the polarity of one preselected coil group of said second running pole, and for connecting the one preselected coil group of said first and second running poles in series circuit with said second plurality of coil groups to establish when selectively energized running poles $P_2$ of a different total number than running poles $P_1$ to produce another speed of operation for the motor.

2. The multispeed motor of claim 1 in which the quotient of the ratio $P_2/P_1$ is a non-integer.

3. In a distributed wound multispeed induction motor having a slotted stator and being selectively operative at a plurality of running speeds, a first plurality of distributed wound coil groups formed by conductor turns carried in slots of the stator to provide at least four primary poles $P_1$, with adjacent poles being of opposite instantaneous polarity, and with two preselected primary poles each including at least first and second coil groups; said first plurality of coil groups thereby producing a first speed of operation for the motor when energized; a second plurality of distributed wound coil groups formed by conductor turns carried in slots of the stator; a third plurality of distributed wound coil groups carried by slots of the stator providing at least four auxiliary poles; means for energizing the third plurality of distributed wound coil groups during all conditions of starting the motor and for connecting said second plurality of coil groups in circuit with said first coil group of each preselected primary pole and inactivating said second coil group of said preselected primary poles to form primary poles $P_2$ different in number from primary poles $P_1$ thereby producing a second speed of operation for the motor whereby efficient slot utilization is provided and proper selections of magnetic polar relations of said first and second coil groups and of a number of conductor turns in said first and second distributed wound coil groups to attain a desired effective ampere-turn pattern for the primary poles is permitted.

4. In a multispeed induction motor having a slotted stator and being selectively operative at two or more running speeds, one plurality of coils groups carried in slots of the stator forming at least two primary poles, with adjacent poles being of opposite instantaneous polarity, and with at least one preselected primary pole including at least first and second coil groups to provide one speed of operation for the motor; another plurality of coil groups carried in slots of the stator; a number of auxiliary coils accommodated in the stator slots forming auxiliary poles; and means for energizing the number of auxiliary coils when the motor is being started for all speeds of operation and for connecting said other plurality of coil groups in circuit with said first coil group of said one preselected primary pole to provide another speed of operation for the motor, with said second coil group of said one preselected primary pole being inactive at said another speed of operation, whereby the proper selections of magnetic polar relations of said first and second coil groups and of a desired effective ampere-turn pattern for the primary poles at the two or more running speeds are permitted.

5. In a distributed wound multispeed induction motor selectively operative at a plurality of running speeds, a stator core having a number of slots, a first plurality of distributed wound coil groups in excess of two formed by conductor turns accommodated in some of the stator slots in angularly spaced apart relation to provide a total number of magnetic primary poles $P_1$, with adjacent poles being of opposite instantaneous polarity, and with poles $P_1$ providing a first speed of operation when the first plurality of coil groups are selectively energized; a second plurality of distributed wound coil groups formed of conductor turns accommodated in some of the stator slots in angularly spaced apart relation; a third plurality of distributed wound coil groups carried in the stator slots forming auxiliary poles; means for energizing the third plurality of coil groups when the motor is being started for all speeds of operation, for selectively energizing a first preselected coil group of poles $P_1$ with the same polarity as for the first speed of operation, for reversing the polarity of a second preselected coil group of poles $P_1$, and for connecting said first and preselected coil groups in circuit with said second plurality of coil groups to establish total primary poles $P_2$ of a different total number than poles $P_1$ to effect a second speed of operation when selectively energized, whereby the proper selections are permitted of magnetic polar relations of said first and second preselected coil groups and of a number of conductor turns in said first and second plurality of distributed wound coil groups to provide a desired effective ampere-turn pattern for the primary poles $P_1$, $P_2$, with the stator slots being efficiently utilized.

6. In a distributed wound multispeed induction motor selectively operative at a plurality of running speeds, a stator core having a number of slots, a first plurality of concentric coil groups formed by conductor turns accommodated in some of the stator slots to provide a total number of magnetic primary poles $P_1$, said poles $P_1$ providing a first speed of operation when the first plurality of concentric coil groups are selectively energized; second and third pluralities of concentric coil groups formed of conductor turns accommodated in some of the stator slots, with the third plurality forming auxiliary poles; and means for energizing at least the third plurality of concentric coil groups whenever the motor is started during all speeds of operation, and for energizing a preselected coil group of said first plurality of coil groups in series with said second plurality of concentric coil groups to establish total primary poles $P_2$ of a different total number than poles $P_1$ to effect another speed of operation with said preselected coil group being in differential magnetic polar relation to at least one of the coil groups in a given running pole of $P_2$, thereby permitting the attainment of a desired effective ampere turn pattern for said given primary pole.

7. In a distributed wound multispeed induction motor selectively operative at a plurality of running speeds, a first plurality of distributed wound coil groups formed by conductor turns to provide at least four run poles $P_1$, with adjacent poles being of opposite instantaneous polarity, and with two preselected run poles each including at least first and second coil groups; said first plurality of coil groups thereby producing a first speed of operation for the motor when energized; a second plurality of distributed wound coil groups formed by conductor turns; means connecting said second plurality of coil groups in circuit with said first coil group of each preselected run pole and inactivating said second coil groups of said preselected run poles to form run poles $P_2$ different in number from run poles $P_1$ thereby producing a second speed of operation for the motor; and said second plurality of coil groups including at least one coil group in cummulative magnetic polar relation with one coil group of at least one of the preselected running poles, thereby permitting a reduction in the number of conductor turns otherwise required to produce a desired ampere-turn pattern for a given running pole $P_2$.

8. In a distributed wound multispeed induction motor selectively operative at a plurality of running speeds, a first plurality of distributed wound coil groups formed by conductor turns to provide at least four run poles $P_1$, with adjacent poles being of opposite instantaneous polarity, and with two preselected run poles each including at least first and second coil groups; said first plurality of coil groups thereby producing a first speed of operation for the motor when energized; a second plurality of distributed wound coil groups formed by conductor turns; means connecting said second plurality of coil groups in circuit with said first coil group of each preselected run pole and inactivating said second coil groups of said preselected run poles to form run poles $P_2$ different in number from run poles $P_1$ thereby producing a second speed of operation for the motor; and said second plurality of coil groups having at least one coil group in differential magnetic polar relation to at least one of the coil groups of a preselected run pole of $P_1$ energized during the second speed of operation thereby permitting the attainment of a desired effective ampere-turn pattern for a given running pole $P_2$.

9. In a distributed wound multispeed induction motor selectively operative at a plurality of running speeds, a stator core having a number of slots, a first plurality of distributed wound coil groups in excess of two formed by conductor turns accommodated in some of the stator slots in angularly spaced apart relation to provide a total number of magnetic running poles $P_1$, with adjacent poles being of opposite instantaneous polarity, and with poles $P_1$ providing a first speed of operation when the first plurality of coil groups are selectively energized; a second plurality of distributed wound coil groups formed of conductor turns accommodated in some of the stator slots in angularly spaced apart relation; means for energizing a first preselected coil group of poles $P_1$ with the same polarity as for the first speed of operation for reversing the polarity of a second preselected coil group of poles $P_1$ and for connecting said first and preselected coil groups in circuit with said second plurality of coil groups to establish total running poles $P_2$ of a different total number than poles $P_1$ to effect a second speed of operation when selectively energized; said second plurality of coil groups including at least one coil group in cumulative magnetic polar relation with at least one of the preselected coil groups of $P_1$ to form one of the running poles of $P_2$, thereby permitting a reduction in the number of conductor turns otherwise required to produce a desired effective ampere-turn pattern for the one running pole of $P_2$.

10. In a distributed wound multispeed induction motor selectively operative at a plurality of running speeds, a stator core having a number of slots, a first plurality of distributed wound coil groups in excess of two formed by conductor turns accommodated in some of the stator slots in angularly spaced apart relation to provide a total number of magnetic running poles $P_1$, with adjacent poles being of opposite instantaneous polarity, and with poles $P_1$ providing a first speed of operation when the first plurality of coil groups are selectively energized; a second plurality of distributed wound coil groups formed of conductor turns accommodated in some of the stator slots in angularly spaced apart relation; means for energizing a first preselected coil group of poles $P_1$ with the same polarity as for the first speed of operation for reversing the polarity of a second preselected coil group of poles $P_1$ and for connecting said first and preselected coil groups in circuit with said second plurality of coil groups to establish total running poles $P_2$ of a different total number than poles $P_1$ to effect a second speed of operation when selectively energized; and said second plurality of coil groups having at least one coil group in differential magnetic polar relation to at least one of the preselected coil groups to form one of the running poles of $P_2$ during the second speed of operation, thereby permitting the attainment of a desired effective ampere-turn pattern for the one running pole of $P_2$.

References Cited
UNITED STATES PATENTS

| | | | |
|---|---|---|---|
| 1,918,323 | 7/1933 | Dederick et al. | 318—224 |
| 2,174,758 | 10/1939 | Rall | 318—224 |
| 3,167,700 | 1/1965 | Nayhouse | 318—224 |

ORIS L. RADER, *Primary Examiner.*

G. RUBINSON, *Assistant Examiner.*